United States Patent
Desaki et al.

(10) Patent No.: US 9,616,847 B2
(45) Date of Patent: *Apr. 11, 2017

(54) ON/OFF DETECTING BUCKLE SWITCH

(71) Applicant: HOSIDEN CORPORATION, Osaka (JP)

(72) Inventors: Kenjiro Desaki, Osaka (JP); Hirofumi Koizumi, Osaka (JP); Takashi Ishibashi, Osaka (JP)

(73) Assignee: HOSIDEN CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/417,826

(22) PCT Filed: Jul. 22, 2013

(86) PCT No.: PCT/JP2013/069790
§ 371 (c)(1),
(2) Date: Jan. 28, 2015

(87) PCT Pub. No.: WO2014/027544
PCT Pub. Date: Feb. 20, 2014

(65) Prior Publication Data
US 2015/0217723 A1      Aug. 6, 2015

(30) Foreign Application Priority Data

Aug. 13, 2012   (JP) ................................. 2012-179270

(51) Int. Cl.
*A44B 11/25*   (2006.01)
*B60R 22/48*   (2006.01)
(Continued)

(52) U.S. Cl.
CPC .............. *B60R 22/48* (2013.01); *B60R 16/02* (2013.01); *B60R 2022/4816* (2013.01)

(58) Field of Classification Search
CPC . B60R 22/48; H01H 3/16; H01H 1/00; H01H 1/06; H01H 1/12; H01H 1/14;
(Continued)

(56) References Cited

U.S. PATENT DOCUMENTS 7,842,894 B2 *  11/2010  Borst .................... 200/61.58 B
8,921,723 B2    12/2014  Yamanaka et al.
(Continued)

FOREIGN PATENT DOCUMENTS

DE          2648418 A1    4/1978
JP          52-75077      6/1977
(Continued)

OTHER PUBLICATIONS

International Search Report with English translation and English translation of Written Opinion of the International Searching Authority in PCT/JP2013/069790, mailed Oct. 15, 2013.

(Continued)

*Primary Examiner* — Anthony R. Jimenez
(74) *Attorney, Agent, or Firm* — Greenblum & Bernstein, P.L.C.

(57)   ABSTRACT

An ON/OFF detecting buckle switch includes: a case in a housing shape; a substrate fixing member equipped in an inner side face of the case; a slider insertion port equipped in an upper face of the case; a support portion equipped in an inner side face of the case; a first fixed terminal folded stepwise in a longitudinal direction of a strip shape to circumvent the substrate fixing member, having one end provided with a notched portion and the other end fixed to the inner side face of the case; a first movable terminal in a strip shape having one area fixed to the support portion; a slider provided with a terminal press portion that projects inside the case penetrating through the slider insertion port and the notched portion, and when pressed down, presses (Continued)

down an end of the first movable terminal; and a spring that biases the slider upward.

1 Claim, 10 Drawing Sheets

(51) Int. Cl.
*H01H 3/16* (2006.01)
*B60R 16/02* (2006.01)

(58) Field of Classification Search
CPC .. H01H 3/00; H01H 3/02; H01H 3/12; H01H 3/32; H01H 13/00; H01H 13/04; H01H 13/20; H01H 13/26; H01H 13/28; H01H 13/36; H01H 13/365; H01H 13/38; H01H 13/50; H01H 13/52; H01H 2001/12; H01H 2001/14; H01H 2001/2025; H01H 2003/00; H01H 2003/02; H01H 2003/026; H01H 2003/12; H01H 2001/146; H01H 2013/00; H01H 2201/00; H01H 2203/00; H01H 2203/002; H01H 2231/026; H01H 2300/008; H01H 1/18; H01H 1/26; H01H 1/30; H01H 1/36; H01H 13/803; H01H 27/04; H01H 81/00; H01H 2003/146; H01H 2225/012; A44B 11/25
USPC .......... 200/61.58 B, 61.58 R, 535, 546, 239, 200/275; 439/188
See application file for complete search history.

(56) References Cited

U.S. PATENT DOCUMENTS

| | | |
|---|---|---|
| 8,952,279 B2 | 2/2015 | Yamanaka et al. |
| 8,952,283 B2 | 2/2015 | Yamanaka et al. |
| 2008/0141505 A1 | 6/2008 | Borst |
| 2014/0262706 A1 | 9/2014 | Desaki et al. |

FOREIGN PATENT DOCUMENTS

| | | |
|---|---|---|
| JP | 54-825 | 1/1979 |
| JP | 63-104268 U | 7/1988 |

OTHER PUBLICATIONS

Chinese Office Action in CN 201380039899.1, dated Jun. 17, 2016, with English language translation.

\* cited by examiner

ON/OFF DETECTING BUCKLE SWITCH

TECHNICAL FIELD

The present invention relates to a buckle switch that detects insertion and removal of a tongue plate equipped in a seat belt to and from a buckle main body.

BACKGROUND ART

On a seat of an automobile and the like, a seat belt device is mounted in order to protect an occupant at the time of emergency, such as collision. For easy insertion and removal of a seat belt device of this type, a buckle device is equipped in a seat of an automobile and the like. A buckle device is configured to spring bias a latch member that latches a tongue plate in a latching direction and also to use a locking member to hold the latch member in a state in which the tongue plate and the buckle main body are latched. In such a buckle device, it is required to indicate by a lamp that the tongue plate and the buckle main body are in a latched state, to control actuation of a belt winding power reduction mechanism and the like, or to enable transmission of information of insertion and removal of a seat belt to an air bag ECU (electronic control unit). Therefore, a buckle switch that detects a latched state is equipped inside the buckle. As a prior art related to a buckle switch of this type, there are, for example, Patent Literature 1 shown below and the like. Among the buckle switches, there are a type of switch that detects only a conducting/opening state of a contact point at the time of insertion and removal (hereinafter, referred to as an ON/OFF detecting buckle switch) and a type of switch that detects a change in resistance value at the time of insertion and removal (hereinafter, referred to as a resistance value detecting buckle switch).

PRIOR ART LITERATURE

Patent Literature

Patent Literature 1: Japanese Utility Model Registration Application Laid Open No. S63-104268

SUMMARY OF THE INVENTION

Problems to be Solved by the Invention

The ON/OFF detecting buckle switches require fewer components and are relatively simple in structure. In contrast, the resistance value detecting buckle switches have a large number of component items compared with the ON/OFF detecting buckle switches and tend to be complex in structure. For such reason, conventionally, cases for an ON/OFF detecting buckle switch and for a resistance value detecting buckle switch have not been used in common. With that, it is an object of the present invention to provide an ON/OFF detecting buckle switch allowing a case to be used in common with a resistance value detecting buckle switch.

Means to Solve the Problems

An ON/OFF detecting buckle switch of the present invention includes: a case in a housing shape; a substrate fixing member equipped in an inner side face of the case; a slider insertion port equipped in an upper face of the case; a support portion equipped in an inner side face of the case; a first fixed terminal folded stepwise in a longitudinal direction of a strip shape to circumvent the substrate fixing member, having one end provided with a notched portion and the other end fixed to the inner side face of the case; a first movable terminal in a strip shape having one area fixed to the support portion; a slider provided with a terminal press portion that projects inside the case penetrating through the slider insertion port of the case and the notched portion of the first fixed terminal, and when pressed down, presses down an end of the first movable terminal; and a spring that biases the slider upward. When the slider is not pressed down, the first fixed terminal and the first movable terminal make contact conductively in part, and, when the slider is pressed down, the first fixed terminal and the first movable terminal are separated to be in an insulated state.

Effects of the Invention

According to the ON/OFF detecting buckle switch of the present invention, it is possible to use a case in common with a resistance value detecting buckle switch.

BRIEF DESCRIPTION OF THE DRAWINGS

FIG. 2A is a side view, FIG. 2B is a front view, and FIG. 2C is a bottom view.

DETAILED DESCRIPTION OF THE EMBODIMENTS

Detailed descriptions are given below to embodiments of the present invention. The same numeral is given to components having the same function and thus repetitive descriptions are omitted.

First Embodiment

Figure 1:
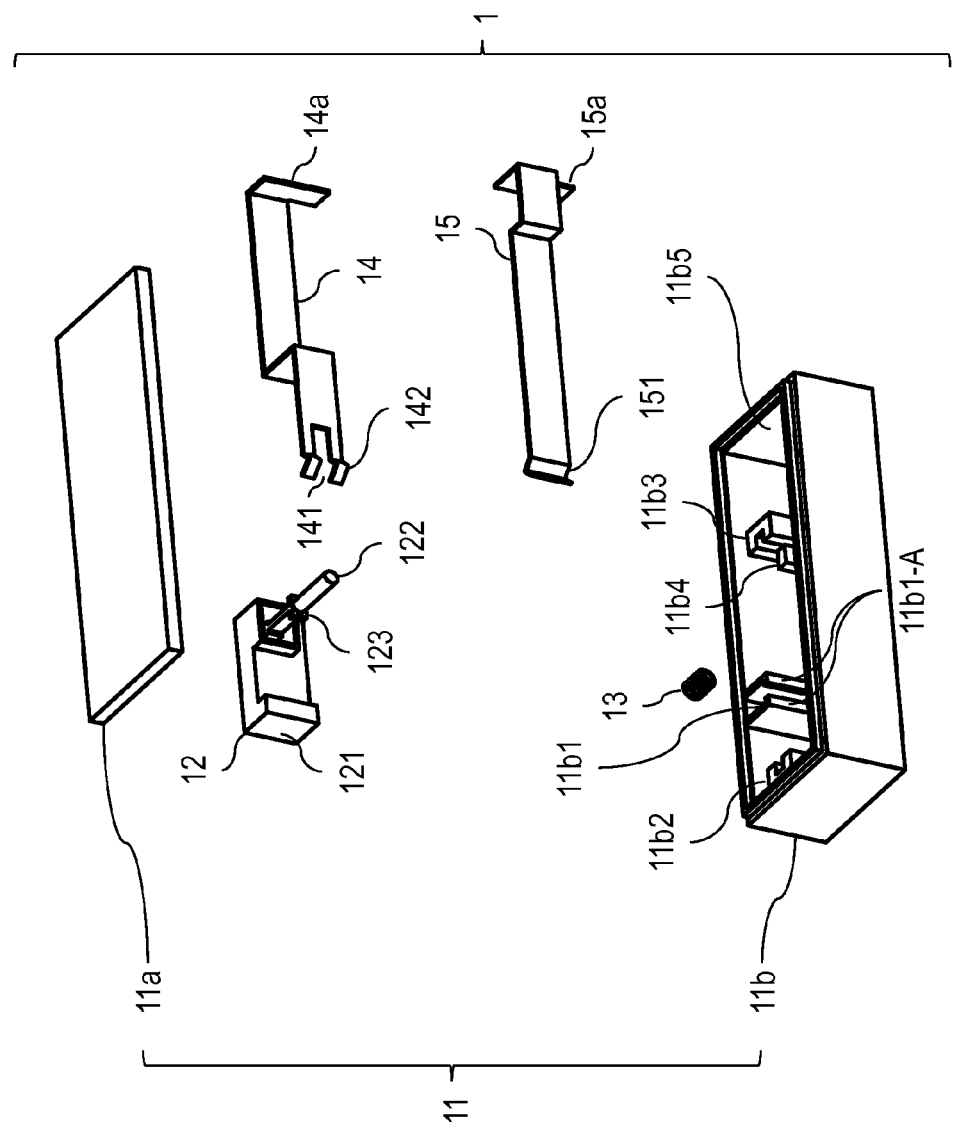
FIG. 1 is an exploded perspective view of an ON/OFF detecting buckle switch in a first embodiment.
Figure 2:
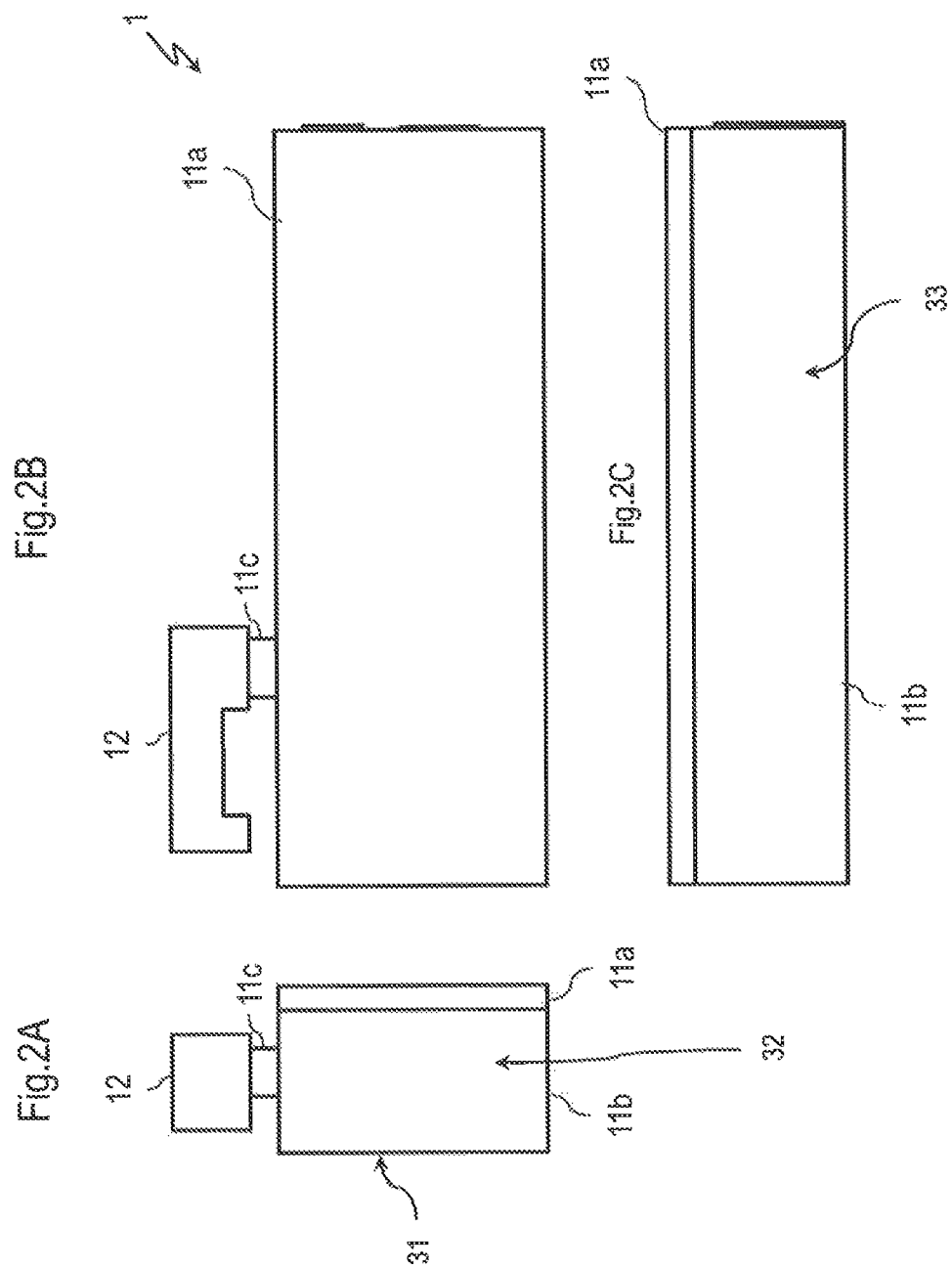
FIGS. 2A-2C are a three-view drawing of the ON/OFF detecting buckle switch in the first embodiment, where
Figure 3:
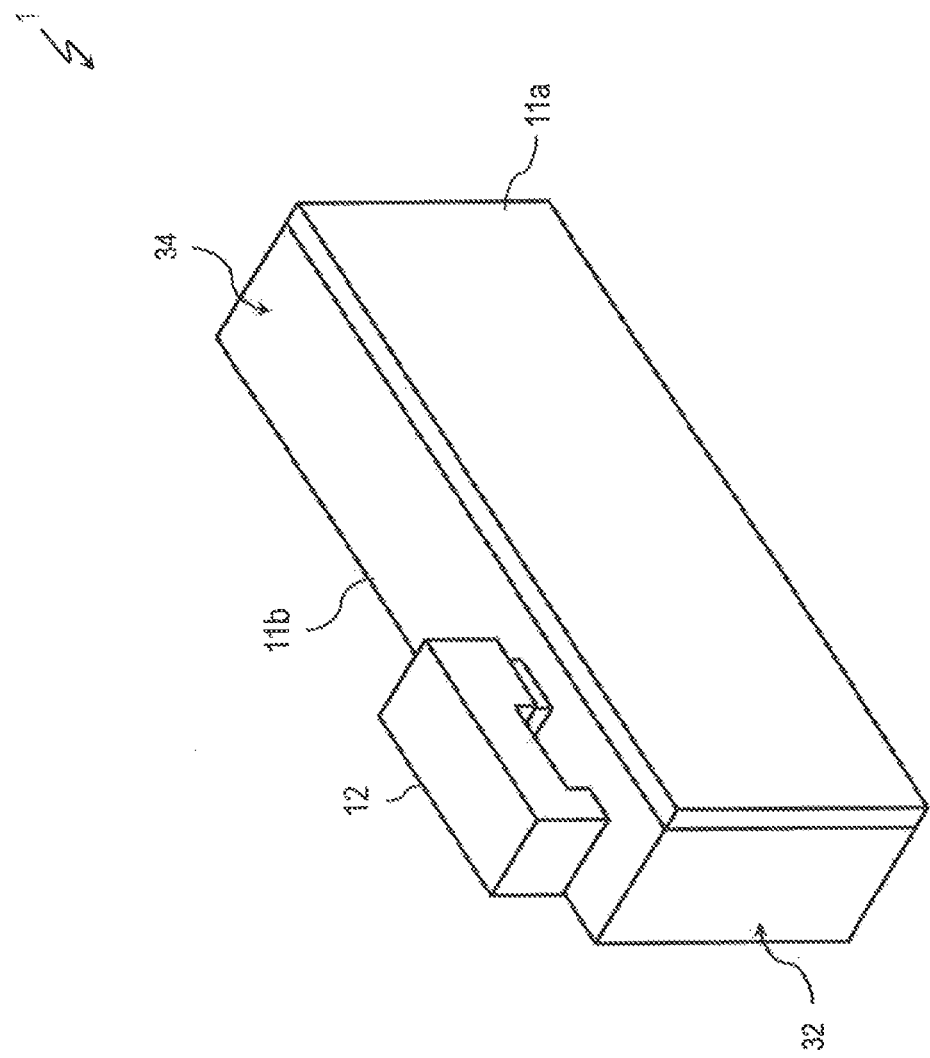
FIG. 3 is a perspective view of the ON/OFF detecting buckle switch in the first embodiment.
Figure 4:
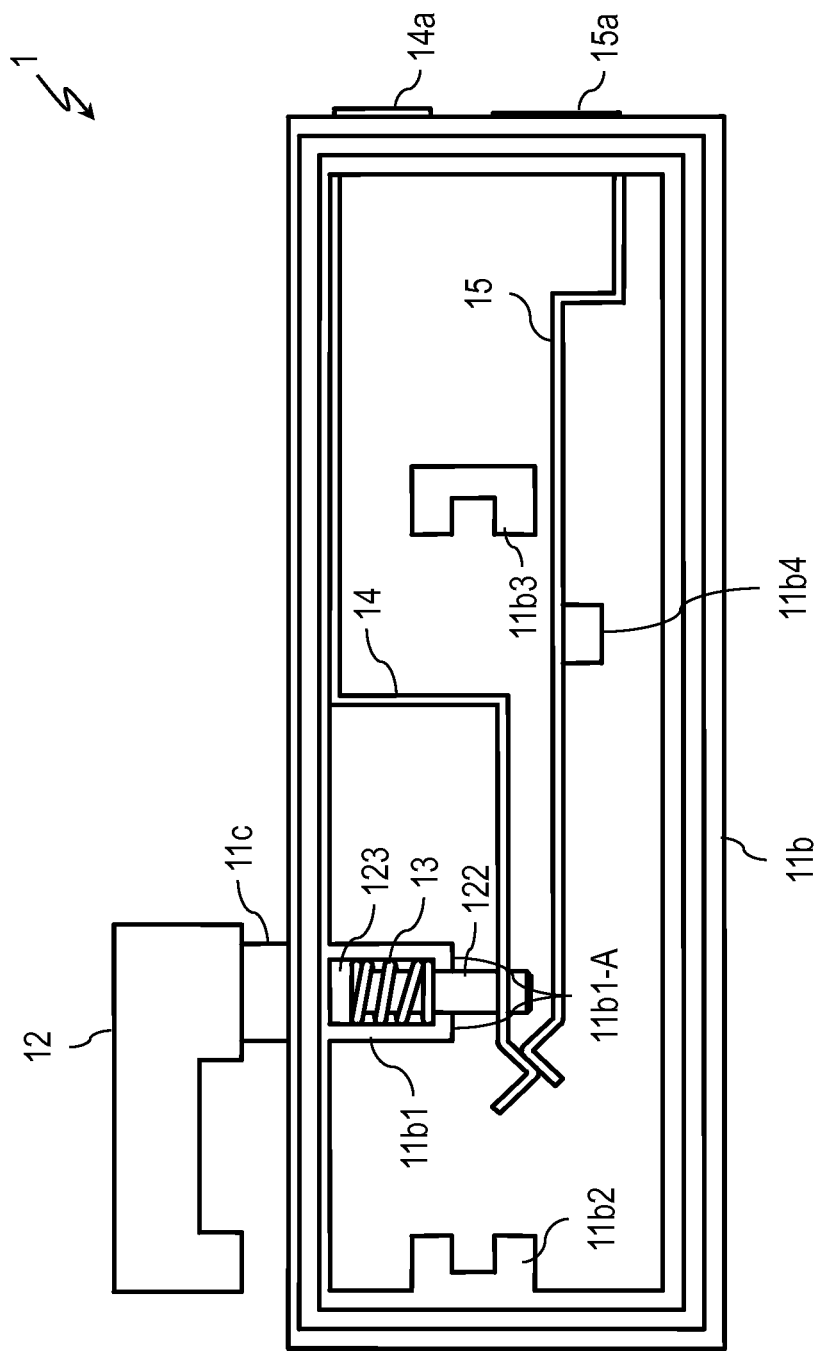
FIG. 4 is a front view of the ON/OFF detecting buckle switch in the first embodiment with a lid removed when a slider is in an initial state.
Figure 5:
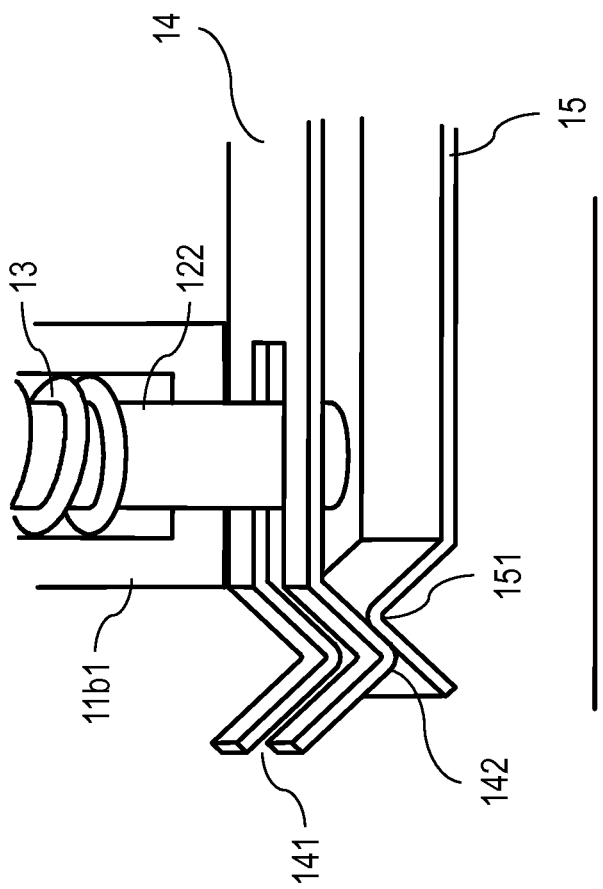
FIG. 5 is a perspective view illustrating relationship of a terminal press portion and a notched portion of a first fixed terminal when a slider is in an initial state.
Figure 6:
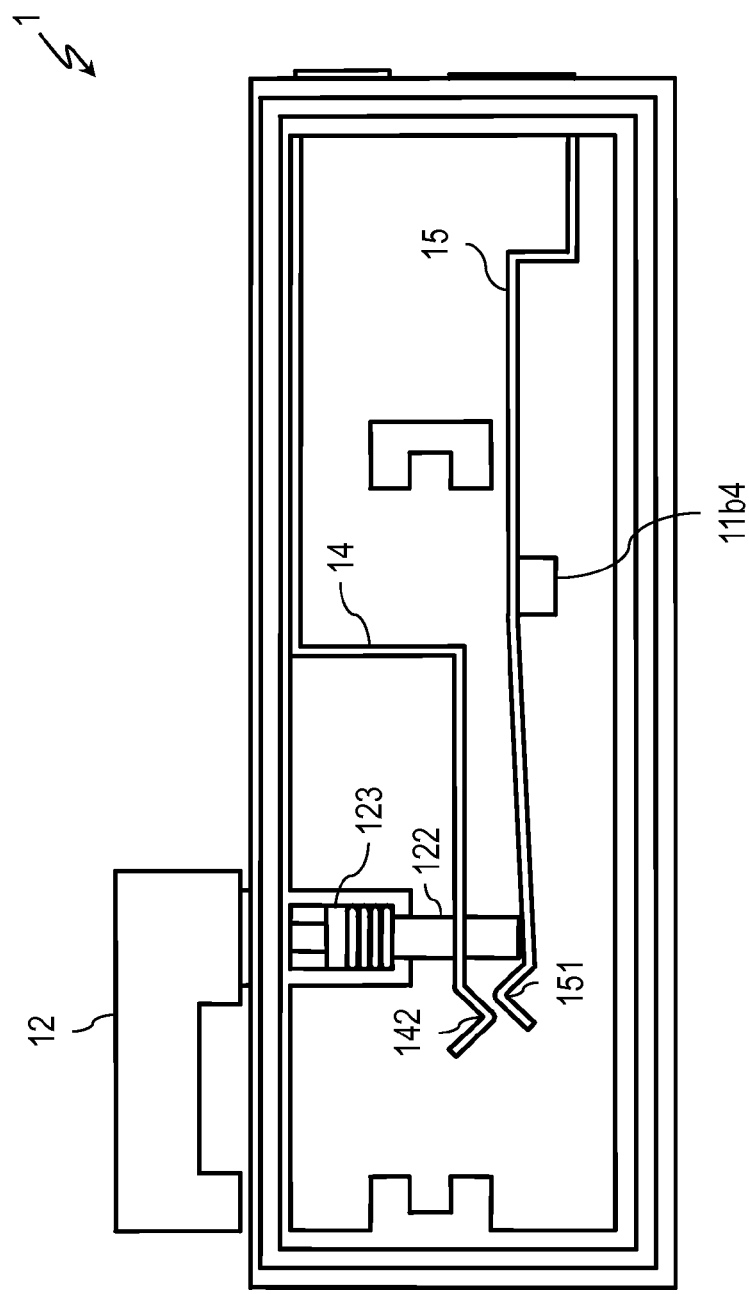
FIG. 6 is a front view of the ON/OFF detecting buckle switch in the first embodiment with a lid removed when a slider is in a latched state.

With reference to FIG. 1 through FIG. 6, an ON/OFF detecting buckle switch 1 in a first embodiment of the present invention is described. FIG. 1 is an exploded perspective view of an ON/OFF detecting buckle switch 1 of the present embodiment. FIG. 2 is a three-view drawing of the ON/OFF detecting buckle switch 1 of the present embodiment. FIG. 2A is a side view, FIG. 2B is a front view, and FIG. 2C is a bottom view. FIG. 3 is a perspective view of the ON/OFF detecting buckle switch 1 of the present embodiment. FIG. 4 is a front view of the ON/OFF detecting buckle switch 1 of the present embodiment with a lid 11a removed when a slider 12 is in an initial state. FIG. 5 is a perspective view illustrating relationship of a terminal press portion 122 and a notched portion 141 of a first fixed terminal 14 when the slider 12 is in the initial state. FIG. 6 is a front view of the ON/OFF detecting buckle switch 1 in the present embodiment with the lid 11a removed when the slider 12 is in a latched state.

As illustrated in FIG. 1, the ON/OFF detecting buckle switch 1 of the present embodiment is provided with a case 11 in a rectangular parallelepiped housing shape, and the case 11 is configured with a removable lid 11a and a storage portion 11b provided with an opening portion 11b5 allowed to be opened and closed by the lid 11a. The lid 11a and the storage portion 11b may be made of resin, such as PBT (polybutylene terephthalate). As illustrated in FIGS. 2 and 3, a side face facing the lid 11a of the storage portion 11b is referred to as a longitudinal side face, two side faces adjacent to the lid 11a are referred to as lateral side faces, and the remaining faces are referred to as a storage portion upper face and a storage portion lower face. Inside the storage portion upper face of the storage portion 11b, a spring storage portion 11b1 that is in an approximately square tube shape and has an open lower face and two open side faces is equipped. In a lower end portion of the spring storage portion 11b1, spring position fixing nails 11b1-A are equipped.

In one of the lateral inner side faces of the storage portion 11b, a first groove portion 11b2 is equipped. In the middle of inside the longitudinal side face of the storage portion 11b, a second groove portion 11b3 in a square tube shape having an opening portion as a groove is equipped to have the groove facing the groove of the first groove portion 11b2. The first groove portion 11b2 and the second groove portion 11b3 are members for positioning fixing of a printed board 16 described later. Hereinafter, the first groove portion 11b2 and the second groove portion 11b3 may also be referred to collectively as a substrate fixing member. In addition, in the middle of the longitudinal inner side face of the storage portion 11b, on a slightly lower side of the second groove portion 11b3, a support portion 11b4 in a square bar shape that supports a first movable terminal 15 described later is equipped vertically to the longitudinal inner side face.

In the storage portion 11b, the slider 12, a spring 13, the first fixed terminal 14, and the first movable terminal 15 are stored. The slider 12 is provided with a tongue plate contact portion 121 in an approximately plate shape and the terminal press portion 122 in an approximately round bar shape that is equipped vertically to a lower face of the tongue plate contact portion 121. In the middle of the terminal press portion 122, a collar 123 is equipped. The slider 12 may be made of sliding resin, such as POM (polyoxymethylene), for example. As illustrated in FIG. 2, a slider insertion port 11c in a square tube shape is equipped outside the upper face of the storage portion 11b, and the terminal press portion 122 of the slider 12 is inserted into the slider insertion port 11c as illustrated in FIG. 4. A lower end of the terminal press portion 122 projects into the case penetrating through the slider insertion port 11c and the opening portion in the lower end of the spring storage portion 11b1. At this time, the spring 13 is stored in the spring storage portion 11b1 of the storage portion 11b, and the terminal press portion 122 of the slider 12 penetrates through an inner space of the spring 13. The spring 13 is positioned in a position containing the terminal press portion 122 by the spring storage portion 11b1 and the spring position fixing nails 11b1-A. When the slider 12 is pressed down, the spring 13 is compressed while being sandwiched between the collar 123 and the spring position fixing nails 11b1-A. The spring 13 may be made of metal, such as a steel material and phosphor bronze.

The first fixed terminal 14 is a conductor in an elongated and thin plate shape (strip shape), and is folded stepwise in the middle so as to avoid the second groove portion 11b3. The first fixed terminal 14 may be of a material, such as brass and phosphor bronze, for example. One end of the first fixed terminal 14 is folded downward to form a folded portion 14a. The folded portion 14a is mounted and fixed to be exposed to outside the side face facing the lateral side face equipped with the first groove portion 11b2 of the storage portion 11b. As illustrated in FIG. 5, in the end of the first fixed terminal 14 opposite to the folded portion 14a, the notched portion 141 is formed. Tip ends of the notched portion 141 are subjected to a bending process to be a hook shape, and bent portions 142 make contact with the first movable terminal 15. The first movable terminal 15 is a conductor in an elongated and thin plate shape (strip shape) similar to the first fixed terminal 14, and is folded stepwise in the middle. The first movable terminal 15 may be of a material, such as brass and phosphor bronze, for example, similar to the first fixed terminal 14. One end of the first movable terminal 15 is folded upward to form a folded portion 15a. The folded portion 15a is mounted and fixed to be exposed to outside the same side face as the folded portion 14a on a slightly lower side from the folded portion 14a to have the first movable terminal 15 approximately parallel to the first fixed terminal 14. The first movable terminal 15 is arranged to be located on an upper face of the support portion 11b4 described above. The end of the first movable terminal 15 opposite to the folded portion 15a is subjected to a bending process to be a hook shape to form a bent portion 151, and the bent portion 151 lightly makes contact with the bent portions 142 of the first fixed terminal 14. When the slider 12 is pressed down and the terminal press portion 122 projects deeply into the storage portion 11b, the terminal press portion 122 is in a position to penetrate through the notched portion 141 of the first fixed terminal 14. Therefore, when the slider 12 is pressed, the terminal press portion 122 hits the upper face of the first movable terminal 15 below it to press down the first movable terminal 15, without making contact with the first fixed terminal 14. At this time, the first movable terminal 15 functions as a cantilever spring with the support portion 11b4 as a fixed end and the end on the bent portion 151 side as a free end as illustrated in FIG. 6. That is, as illustrated in FIG. 6, the bent portion 151 of the first movable terminal 15 is pressed down by the terminal press portion 122 of the slider 12 to have the tip end sinking downward, so that the bent portions 142 of the first fixed terminal 14 and the bent portion 151 of the first movable terminal 15 are separated.

For example, the folded portion 14a is connected to a higher voltage side of a power source and the folded portion 15a to a lower voltage side of the power source and a signal for detection is flown from the power source (not shown), thereby enabling detection of a predetermined current value because the bent portions 142 of the first fixed terminal 14 and the bent portion 151 of the first movable terminal 15 are in a contact state when the slider 12 is in the initial state. In contrast, when the slider 12 is pressed down by a tongue plate (not shown) to be in a latched state, the bent portions 142 of the first fixed terminal 14 and the bent portion 151 of the first movable terminal 15 are separated, so that a current value is not detected. Accordingly, depending on whether or not a current value is detected, it is possible to determine whether the slider 12 is in the initial state or in the latched state.

Second Embodiment

Figure 7:
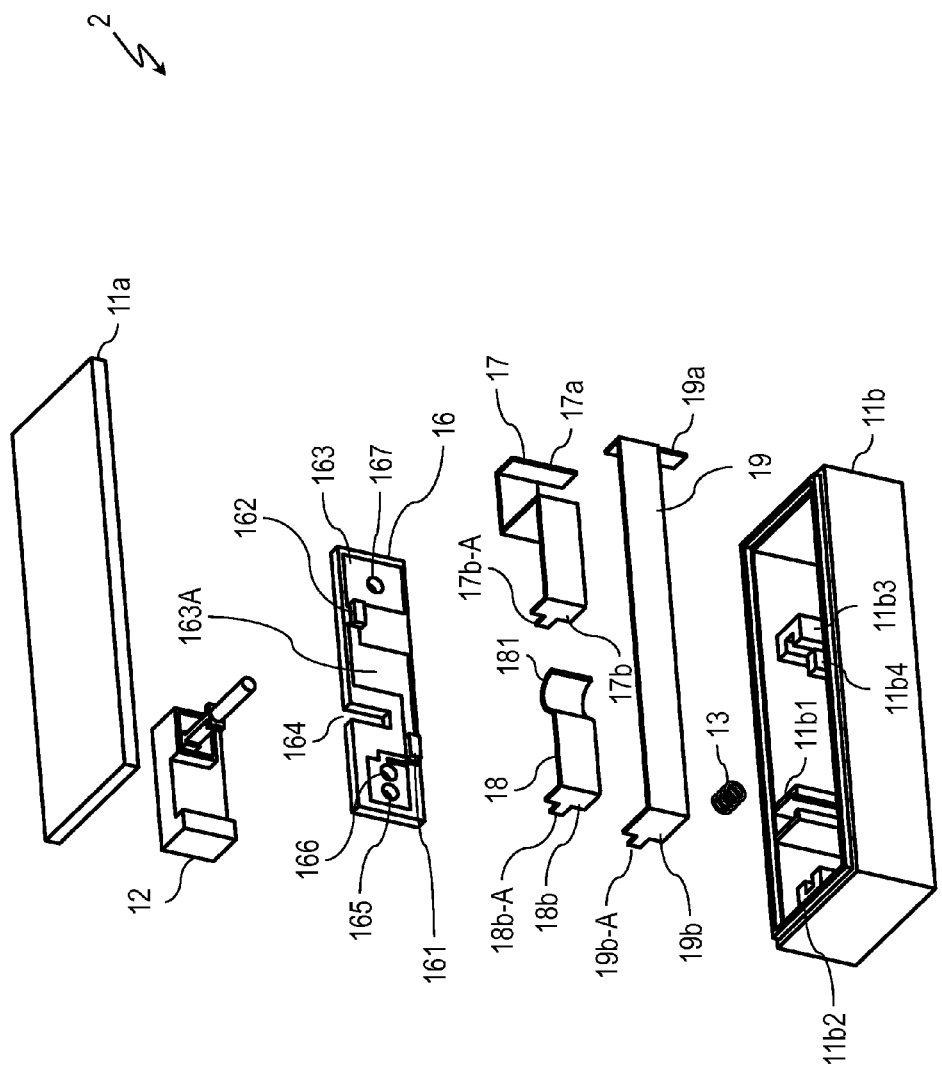
FIG. 7 is an exploded perspective view of a resistance value detecting buckle switch in a second embodiment.
Figure 8:
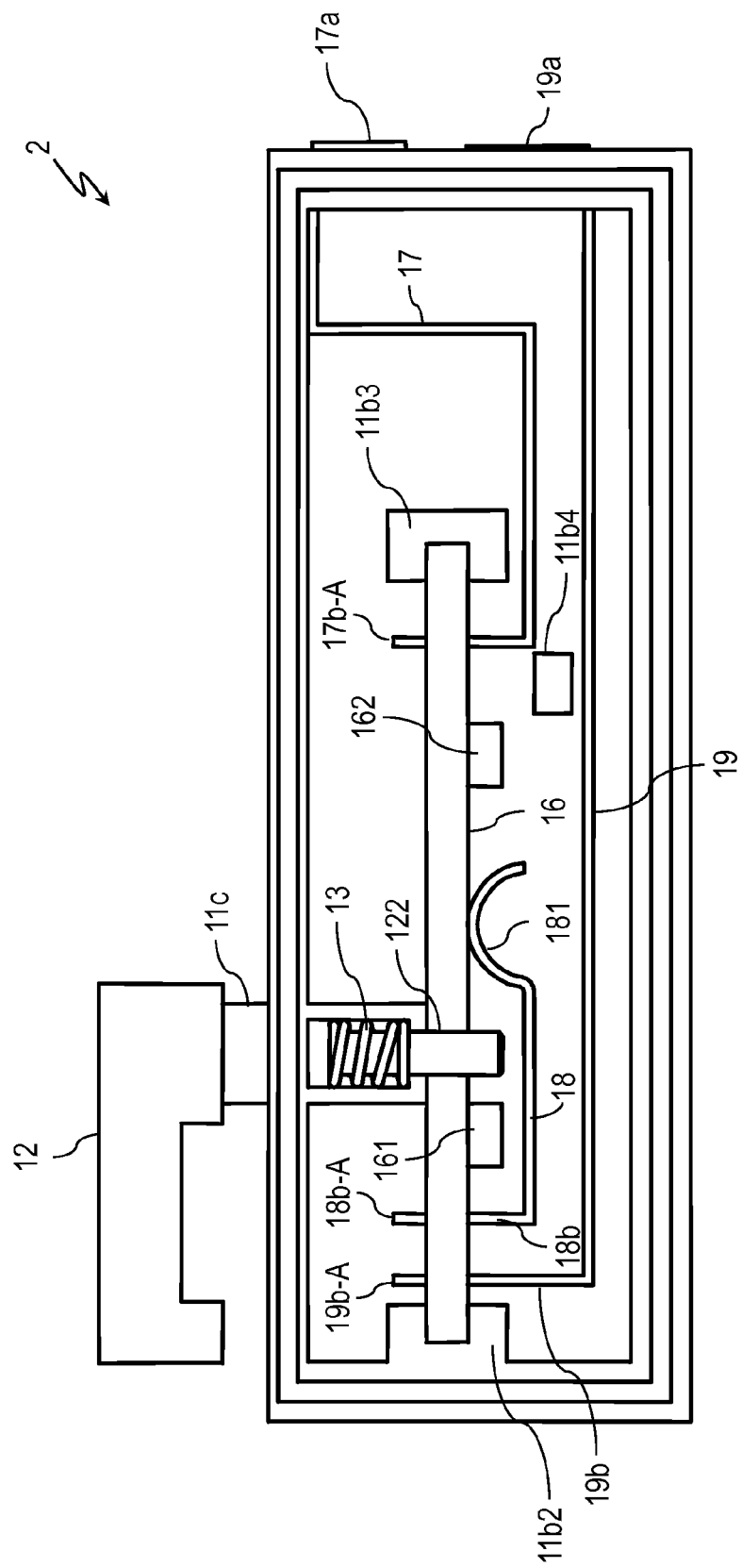
FIG. 8 is a front view of the resistance value detecting buckle switch in the second embodiment with a lid removed when a slider is in an initial state.
Figure 9:
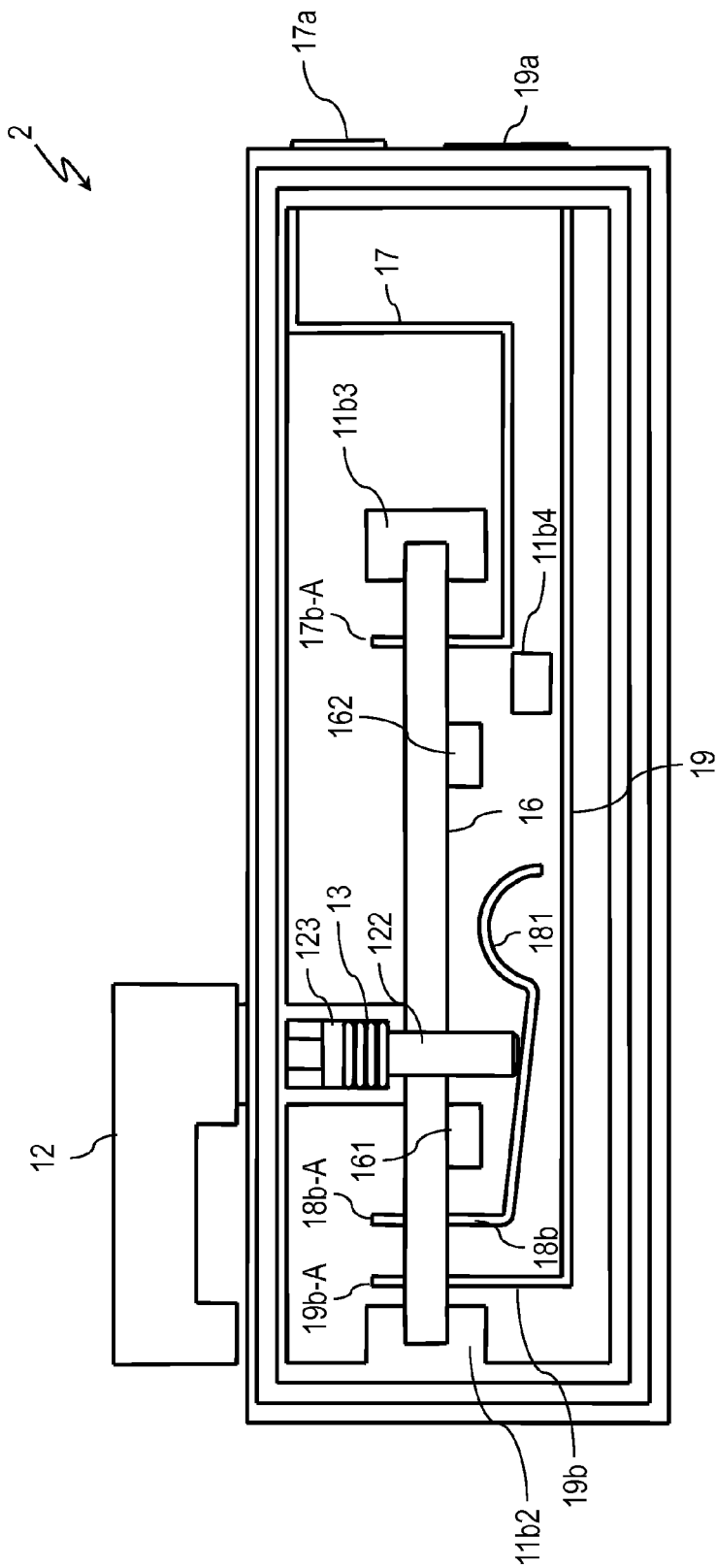
FIG. 9 is a front view of the resistance value detecting buckle switch in the second embodiment with a lid removed when a slider is in a latched state.
Figure 10:
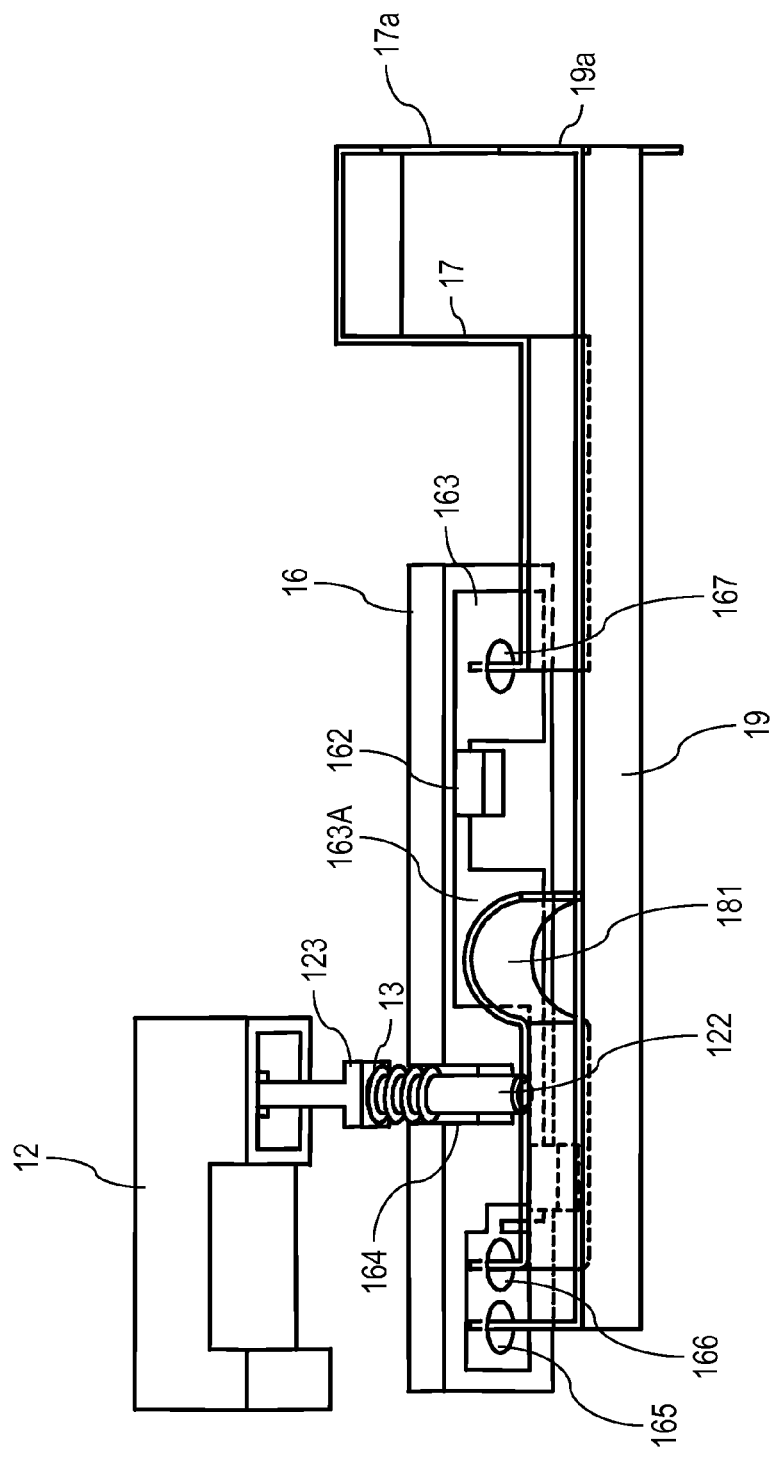
FIG. 10 is a perspective view illustrating relationship of a terminal press portion and a notched portion of a printed board when a slider is in an initial state.

Next, with reference to FIGS. 7 through 10, descriptions are given to a resistance value detecting buckle switch 2 that uses the case 11 of the ON/OFF detecting buckle switch 1 in the first embodiment in common. FIG. 7 is an exploded perspective view of a resistance value detecting buckle switch 2 in the present embodiment. FIG. 8 is a front view of the resistance value detecting buckle switch 2 in the present embodiment with a lid 11a removed when a slider 12 is in an initial state. FIG. 9 is a front view of the resistance value detecting buckle switch 2 in the present embodiment with the lid 11a removed when the slider 12 is in a latched state. FIG. 10 is a perspective view illustrating relationship of a terminal press portion 122 and a notched portion 164 of a printed board 16 when the slider 12 is in an initial state.

As illustrated in FIG. 7, the resistance value detecting buckle switch 2 in the present embodiment shares the case 11 with the ON/OFF detecting buckle switch 1 described above, and in the storage portion 11b of the case 11, the slider 12, the spring 13, the printed board (may also be referred to as a substrate for resistance value detection) 16, a second fixed terminal 17, a second movable terminal 18, and a third fixed terminal 19 are stored. Same as the case of the ON/OFF detecting buckle switch 1, the slider 12 has the terminal press portion 122 penetrating through the slider insertion port 11c and the spring storage portion 11b1 and its lower end projects into the storage portion 11b. Same as the case of the ON/OFF detecting buckle switch 1, the spring 13 containing the terminal press portion 122 is also stored in the spring storage portion 11b1.

The printed board 16 is in a thick strip shape and is provided with two terminal connection holes 165 and 166 in a row in the longitudinal direction in the longitudinal end. The terminal connection hole 165 is equipped in a position closer to the end than the terminal connection hole 166. In addition, in the end opposite to the end equipped with the terminal connection holes 165 and 166, a terminal connection hole 167 is equipped. On a bottom face of the printed board 16, a line 163 is formed so as to join the terminal connection holes 165, 166, and 167 described above. The line 163 has to be formed with a conductor to allow conduction of an electrical signal, and may be copper foil, for example. The vicinity of the middle of the line 163 is referred to as a contact portion 163A. The contact portion 163A is a portion that makes contact with a curved portion 181 of the second movable terminal 18 described later. To the line 163, a first resistor 161 and a second resistor 162 are connected. The first resistor 161 and the second resistor 162 are fixed to the bottom face of the printed board (substrate for resistance value detection) 16. The first resistor 161 is equipped between the terminal connection hole 166 and the contact portion 163A. The second resistor 162 is equipped between the terminal connection hole 167 and the contact portion 163A. The longitudinal end of the printed board (substrate for resistance value detection) 16 is fitted into the groove portions 11b2 and 11b3 described above and the printed board 16 (substrate for resistance value detection) is positioned within the storage portion 11b. The notched portion 164 is equipped in the middle of the printed board (substrate for resistance value detection) 16, and when pressed down, the terminal press portion 122 of the slider 12 is in positional relationship to penetrate through the notched portion 164 without making contact with the printed board (substrate for resistance value detection) 16 to project into the storage portion 11b.

The second fixed terminal 17 is a conductor in an elongated and thin plate shape (strip shape), and is folded stepwise in the middle. Similar to the first fixed terminal 14 and the like, the second fixed terminal 17 may be of a material, such as brass and phosphor bronze, for example. One end of the second fixed terminal 17 is folded downward to form a folded portion 17a. The folded portion 17a is mounted and fixed to be exposed to outside the side face facing the lateral side face equipped with the first groove portion 11b2 of the storage portion 11b. The end of the second fixed terminal 17 opposite to the folded portion 17a is folded upward to form a folded portion 17b. At a tip end of the folded portion 17b, a projecting portion 17b-A is formed and the projecting portion 17b-A is inserted into the terminal connection hole 167 on the printed board 16 from a lower side for fixation. The second movable terminal 18 is a conductor in an elongated and thin plate shape (strip shape) similar to the second fixed terminal 17, and the curved portion 181 in an arch shape expanded upward is formed in its one longitudinal end. The second movable terminal 18 may be of a material, such as brass and phosphor bronze, for example, similar to the first fixed terminal 14 and the like. The end opposite to the curved portion 181 of the second movable terminal 18 is folded upward to form a folded portion 18b. At a tip end of the folded portion 18b, a projecting portion 18b-A is formed and the projecting portion 18b-A is inserted into the terminal connection hole 166 on the printed board 16 from a lower side for fixation. The third fixed terminal 19 is also a conductor in an elongated and thin plate shape (strip shape), and one longitudinal end is folded upward to form a folded portion 19a. The third fixed terminal 19 may be of a material, such as brass and phosphor bronze, for example, similar to the first fixed terminal 14 and the like. The folded portion 19a is mounted and fixed to be exposed to outside the same side face as the folded portion 17a on a slightly lower side from the folded portion 17a to have the third fixed terminal 19 approximately parallel to the second fixed terminal 17. The end of the third fixed terminal 19 opposite to the folded portion 19a is folded upward to form a folded portion 19b. At a tip end of the folded portion 19b, a projecting portion 19b-A is formed and the projecting portion 19b-A is inserted into the terminal connection hole 165 on the printed board 16 from a lower side for fixation.

As illustrated in FIGS. 8 and 10, when the slider 12 is in an initial state, the curved portion 181 of the second movable terminal 18 makes contact with the contact portion 163A of the line 163 on the printed board 16 described above. As illustrated in FIG. 9, when the slider 12 is pressed down and the terminal press portion 122 goes through the notched portion 164 and projects deeply into the storage portion 11b, the lower end portion of the terminal press portion 122 hits the middle of the upper face of the second movable terminal 18 below it to press down the second movable terminal 18. At this time, the second movable terminal 18 functions as a cantilever spring with the projecting portion 18b-A as a fixed end and the end on the curved portion 181 side as a free end. That is, as illustrated in FIG. 9, the second movable terminal 18 is pressed down by the terminal press portion 122 of the slider 12 to have the curved portion 181 sinking downward, so that the contact portion 163A of the line 163 on the printed board 16 and the curved portion 181 of the second movable terminal 18 are separated. As illustrated in FIG. 9, the folded portion 19b is formed longer to avoid contact of the third fixed terminal 19 with other terminals.

For example, the folded portion 17a is connected to a higher voltage side of a power source and the folded portion 19a to a lower voltage side of the power source and a signal for detection is flown from the power source (not shown), thereby causing the curved portion 181 making contact with the contact portion 163A when the slider 12 is in the initial state, and a path of a current for detection becomes folded portion 17a-second fixed terminal 17-folded portion 17b-terminal connection hole 167-line 163-second resistor 162-contact portion 163A-curved portion 181-second movable terminal 18-folded portion 18b-terminal connection hole 166-terminal connection hole 165-folded portion 19b-third fixed terminal 19-folded portion 19a. Accordingly, the resistance value in this path becomes a value approximate to a resistance value of the second resistor 162. In contrast, when the slider 12 is in a latched state, the curved portion 181 does not make contact with the contact portion 163A, so that a path of a current for detection becomes folded portion 17a-second fixed terminal 17-folded portion 17b-terminal connection hole 167-line 163-second resistor 162-contact portion 163A-first resistor 161-terminal connection hole 165-folded portion 19b-third fixed terminal 19-folded portion 19a. Accordingly, the resistance value in this path becomes a value approximate to a combined resistance value of the first resistor 161 and the second resistor 162. Accordingly, by measuring the resistance value, depending on whether the resistance value is approximate to the resistance value of the second resistor 162 or approximate to the combined resistance value of the first resistor 161 and the second resistor 162, it is possible to determine whether the slider 12 is in the initial state or in the latched state.

Thus, the ON/OFF detecting buckle switch 1 in the first embodiment is provided with the first groove portion 11b2 and the second groove portion 11b3 to position the printed board 16 used for detection of the resistance value and has the first fixed terminal 14 formed stepwise so as to avoid the second groove portion 11b3, so that it is possible to use the case 11 in common and to change the specification into the resistance value detecting buckle switch 2 only by replacing other partial components (fixed terminal, movable terminal, printed board). In addition, the storage portion 11b is provided with the support portion 11b4 slightly below the second groove portion 11b3, thereby, not only causing the support portion 11b4 to become a fixed end of the first movable terminal 15 functioning as a cantilever spring, but also the support portion 11b4 not to disturb the connection of components of the resistance value detecting buckle switch 2. Thus, according to the ON/OFF detecting buckle switch 1 in the first embodiment, it is possible to use a case in common with the resistance value detecting buckle switch 2.

DESCRIPTION OF REFERENCE NUMERALS

1 ON/OFF Detecting Buckle Switch
11 Case
11a Lid
11b Storage Portion
11b1 Spring Storage Portion
11b1-A Spring Position Fixing Nail
11b2 First Groove Portion
11b3 Second Groove Portion
11b4 Support Portion
11b5 Opening Portion
11c Slider Insertion Port
12 Slider
121 Tongue Plate Contact Portion
122 Terminal Press Portion
123 Collar
13 Spring
14 First Fixed Terminal
14a Folded Portion
141 Notched Portion
142 Bent Portion
15 First Movable Terminal
15a Folded Portion
151 Bent Portion
2 Resistance Value Detecting Buckle Switch
16 Printed Board (Substrate for Resistance Value Detection)
161 First Resistor
162 Second Resistor
163 Line
163A Contact Portion
164 Notched Portion
165 Terminal Connection Hole
166 Terminal Connection Hole
167 Terminal Connection Hole
17 Second Fixed Terminal
17a Folded Portion
17b Folded Portion
17b-A Projecting Portion
18 Second Movable Terminal
181 Curved Portion
18b Folded Portion
18b-A Projecting Portion
19 Third Fixed Terminal
19a Folded Portion
19b Folded Portion
19b-A Projecting Portion
31 Longitudinal Side Face
32 Lateral Side Face
33 Storage Portion Lower Face
34 Storage Portion Upper Face

What is claimed is:

1. A buckle switch comprising:
a case defined by a housing;
a substrate fixing support provided in each of a lateral inner side face of the case, and a longitudinal inner side face of the case;
a slider insertion port provided in an upper face of the case;
a support portion provided in the longitudinal inner side face of the case;
a first fixed terminal folded stepwise in a longitudinal direction of a strip shape to circumvent the substrate fixing support, having one end provided with a notched portion and the other end fixed to the lateral inner side face of the case;
fixed bent portions comprising tip ends of the notched portion, having a hook shape;
a first movable terminal in a strip shape having one area fixed to the support portion;
a bent portion on one end of the first movable terminal, having a hook shape and making contact with the fixed bent portions;
a slider provided with a terminal press portion that projects inside the case penetrating through the slider insertion port of the case and the notched portion of the first fixed terminal, and when pressed down, presses down an end of the first movable terminal without making contact with the first fixed terminal; and a spring that biases the slider upward; wherein when the slider is not pressed down, the first fixed terminal and the first movable terminal make conductive contact, and when the slider is pressed down, the first fixed terminal and the first movable terminal are separated to be in an insulated state.

* * * * *